United States Patent [19]

Sackmann et al.

[11] Patent Number: 5,356,985

[45] Date of Patent: Oct. 18, 1994

[54] HIGHLY-CONCENTRATED AQUEOUS POLYACRYLONITRILE EMULSIONS AND A METHOD FOR THEIR PREPARATION

[75] Inventors: Günter Sackmann, Leverkusen; Siegfried Korte; Heinrich Alberts, both of Odenthal; Rolf-Volker Meyer, Krefeld, all of Fed. Rep. of Germany

[73] Assignee: Bayer Aktiengesellschaft, Leverkusen, Fed. Rep. of Germany

[21] Appl. No.: 123,256

[22] Filed: Sep. 20, 1993

[30] Foreign Application Priority Data

Oct. 1, 1992 [DE] Fed. Rep. of Germany ....... 4233026

[51] Int. Cl.$^5$ ................................................ C08F 2/16
[52] U.S. Cl. .................................... 524/460; 524/458; 524/516; 524/519; 524/521
[58] Field of Search ............... 524/458, 460, 516, 519, 524/521

[56] References Cited

U.S. PATENT DOCUMENTS

| | | | |
|---|---|---|---|
| 4,339,371 | 7/1982 | Robinson et al. | 524/517 X |
| 4,822,831 | 4/1989 | Kuwajima et al. | 524/458 X |
| 5,200,448 | 4/1993 | Robinson et al. | 524/458 X |

*Primary Examiner*—Judy M. Reddick
*Attorney, Agent, or Firm*—Connolly & Hutz

[57] ABSTRACT

The present invention relates to aqueous emulsions of polymers which contain 80 to 100 weight % of acrylonitrile polymerized within them, to a method for their preparation, and to their use as raw materials for acrylic and modacrylic fibres and as dyeing additives for adjusting the dyestuff affinity of cationic dyestuffs for conventional acrylic and modacrylic polymers and fibre materials produced from them.

8 Claims, No Drawings

HIGHLY-CONCENTRATED AQUEOUS POLYACRYLONITRILE EMULSIONS AND A METHOD FOR THEIR PREPARATION

The present invention relates to highly-concentrated aqueous emulsions of polymers which contain 80 to 100 weight % of acrylonitrile polymerised within them, to a method for their preparation, and to their use as raw materials for acrylic and modacrylic fibres and as dyeing additives for adjusting the dyestuff affinity of cationic dyestuffs for conventional acrylic and modacrylic polymers and fibre materials produced from them.

The preparation of stable aqueous emulsions of acrylonitrile homopolymers and copolymers with a very high acrylonitrile content has hitherto not been possible, or has been possible only under very restricted conditions. Unstable emulsions, or in most cases no emulsions at all, are obtained (see Houben-Weyl, Methoden der organischen Chemie, Volume E20/Part 2, page 1216 et seq., G. Thieme Verlag, Stuttgart, 1987). It is possible to prepare stable polyacrylonitrile (PAN) emulsions with solids contents less than 8 weight %, but only from dilute aqueous solution with a very low monomer content, by employing special radical starters which introduce ionic or other hydrophilic terminal groups into the polymer and thus exert a stabilizing effect. Moreover, stable emulsions have hitherto only been formed from copolymers containing sulphonic acid groups, produced from acrylonitrile and sodium styrene sulphonate for example, if the polymerisation was discontinued at a low level of conversion and the monomer concentration was no higher than 5 weight %.

A method of polymerization according to DE-OS 2 709 503 ($\cong$U.S. Pat. No. 4,130,525), which however can only be carried out at very high temperatures resulting in degradation of the products, and at high pressures, leads to stable aqueous polyacrylonitrile emulsions with particle diameters less than 1 $\mu$m and polymer concentrations up to 30 weight %. Copolymers of acrylonitrile and copolymerizable compounds containing sulphonic acid groups are prepared at temperatures >120° C. and at pressures from 5 to 100 bar in an aqueous phase by radical polymerization by this method. As is shown in a comparative example in the above patent, stable polyacrylonitrile emulsions are not obtained from this reaction if these drastic reaction conditions are not employed. Apart from the difficulty of controlling this reaction, it is primarily the thermal degradation and the resultant inadequate quality of the polymers obtained by this method which prevent its use for the manufacture of fibres.

The object of the present invention is to provide highly-concentrated aqueous emulsions of polymers with acrylonitrile contents from 80 to 100 weight %, and to prepare these directly and with solids contents from 10 to 55 weight % by a simple emulsion polymerization method which is easily carried out.

It has now been found that, when using polymeric emulsifying agents containing sulphonic acid groups of general formulae (I) or (II) in the emulsion polymerization of monomer mixtures containing acrylonitrile, stable aqueous emulsions of acrylonitrile (co)polymers can be prepared, with acrylonitrile contents from 80 to 100 weight % and with solids contents up to about 55 weight %.

The present invention relates to a method of preparing aqueous emulsions of polymers with acrylonitrile contents from 80 to 100 weight % in the (co)polymer, which is characterized in that monomer mixtures containing at least 80 weight % of acrylonitrile are polymerized in aqueous emulsion in the presence of radical initiators and in the presence of a polymeric emulsifying agent consisting of structural units containing a polymer and corresponding to general formulae (I) and/or (II)

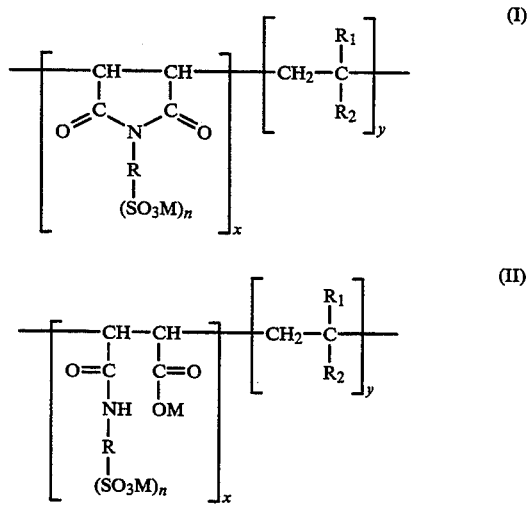

where
M represents a cation-forming radical, preferably H, Na, K, NH$_4$ or R$_3$NH$_3$,
n is 1 or 2,
R represents a hydrocarbon chain with 1 to 10 C atoms or an aromatic radical with 6 to 10 C atoms, preferably a radical derived from a C$_1$-C$_4$ alkane or from benzene, methylbenzene or naphthalene, or —(CH$_2$)$_2$NH(CH$_2$)$_2$—,
R$_1$ represents H or —CH$_3$,
R$_2$ represents H, a C$_1$-C$_{16}$ alkyl radical, preferably —CH$_3$, —C$_2$H$_5$, —C$_4$H$_9$, —CH$_2$—C(CH$_3$)$_3$, —C$_{14}$H$_{29}$ or C$_{16}$H$_{33}$, or phenyl,
R$_3$ represents a hydrocarbon radical of an amine, and
x and y are selected so that the weight average molecular weight M$_w$ of the polymers (I) and (II) is 2000 to 500,000, preferably 5000 to 100,000, and the x:y ratio is 1:4 to 1:1, preferably 1:3 to 1:1.

The present invention also relates to the aqueous emulsions obtained by this means.

The emulsifying agents used according to the invention may comprise mixtures in which preferably >80%, most preferably >90%, based on the mixture, of structural units (I) exist in addition to structural units (II). The polymer corresponding to formula (I) may also be used on its own as the polymeric emulsifying agent. The amount of polymeric emulsifying agent is 2 to 25 weight %, preferably 2 to 20 weight %, based on the monomers to be polymerized.

The polymeric emulsifying agents corresponding to general formulae (I) and (II) comprise reaction products of alternating copolymers formed from maleic anhydride and α-olefines or styrene. The procedure used for their preparation may be as follows:

Copolymers formed from maleic anhydride or maleic acid (half)esters and olefines of formula

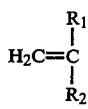

where
R₁ and R₂ have the same meanings as in formulae I and II, are reacted with aminosulphonic acids or their salts of formula $H_2N-R-(SO_3M)_n$, where R, M and n have the same meanings as in formulae I and II, in organic solvents or preferably in aqueous solution at temperatures up to 250° C., preferably 100° to 250° C., most preferably 120° to 200° C., and for times of reaction of 5 to 20 hours, preferably 10 to 15 hours.

An exact description of the preparation of polymeric emulsifying agents such as these is to be found in DE-OS 38 07 097 ($\cong$U.S. Pat. Nos. 4,931,510 and 5,013,794) and in DE-OS 40 19 798 ($\cong$EP-A 462 469).

Alternating or randomly structured copolymers formed from maleic anhydride and ethylene, styrene, α-methyl styrene, propylene, isobutylene, butene-1, diisobutylene, dodecene-1, hexadecene-1 and octadecene-1, for example, are preferred, wherein the molar ratio of maleic anhydride to the monomers to be copolymerized is between 1:1 and 1:4. The preparation of such copolymers is known, and is described, for example, in Houben-Weyl, Methoden der organischen Chemie, Volume E20/Part 2, Georg Thieme Verlag, Stuttgart, 1987, page 1237 et seq.

The following monomers may be used for the preparation of the aqueous emulsions according to the invention: acrylonitrile on its own, and mixtures of acrylonitrile with styrene, α-methyl styrene, vinyl acetate, ethyl acrylate, methyl methacrylate, n-butyl acrylate, i-butyl acrylate, methyl acrylate, 2-ethylhexyl acrylate, halogen-containing vinyl monomers (e.g. vinyl chloride, vinylidene chloride and vinyl bromide) or their mixtures. Acrylonitrile on its own and its mixtures with n-butyl acrylate, methyl acrylate and vinyl acetate are preferred, the above-mentioned compounds preferably being present in amounts from 2.5 to 20.0 weight %, most preferably 2.5 to 10.0 weight %.

Acrylonitrile or its mixtures with other monomers may be polymerized in the presence of compounds of formulae I and II in aqueous emulsion in the manner known in the art with the aid of various initiators. Suitable initiators comprise potassium persulphate, sodium persulphate, ammonium persulphate, organic peroxides, hydrogen peroxide, and redox systems such as $H_2O_2$/Rongalite, ammonium persulphate/Rongalite, sodium or potassium persulphate/Rongalite, t-butyl hydroperoxide/ascorbic acid, persulphate/sulphite/$Fe^{2+}$, etc., for example. Temperatures from 20° to 100° C., preferably from 40° to 100° C., are required for the polymerization.

In order to carry out the emulsion polymerization an aqueous solution of the emulsifying agent mixture may be provided, followed by the gradual, separate, metered addition of the monomers and the initiator, over 2 to 6 hours for example. Alternatively, part of the polymeric emulsifying agent may be introduced into water and the rest added in metered amounts together with the monomers and the initiator in separate streams, likewise in a gradual manner, over 2 to 6 hours. The emulsifying agent, initiator and monomers may also be added separately and continuously in metered amounts over the entire period required for polymerization, with only water being provided at the beginning. A batch mode of operation is also possible, by mixing together the emulsifying agent, monomer (mixture) and initiator, heating to the desired polymerization temperature and maintaining the mixture at this temperature for 2 to 10 hours.

After the completion of the polymerization reaction a finely-divided aqueous polymer emulsion is obtained, which is free from precipitated matter. The average particle diameters in the emulsions, as determined by laser correlation spectroscopy, are 60 to 500 nm, preferably 80 to 200 nm. The size of the particles can be controlled to a certain extent by the amount of polymeric emulsifying agent used; the particle size decreases as the amount of emulsifying agent increases.

The polymers obtained have K values as defined by H. Fikentscher (Cellulosechemie 15 (1932) page 58 et seq.) from 60 to 150, preferably—particularly for the manufacture of textile fibres—from 70 to 90. The K values of the polymers can be extensively adjusted to obtain the desired values by means of the concentration of the initiator or by means of control substances, e.g. thioglycol, n-dodecyl mercaptan or nitro compounds (the K value is a measure of the molecular weight).

In addition to homopolymers and/or copolymers of acrylonitrile and/or its mixtures with other monomers which are used for polymerization, the polymer emulsions also contain proportions of a graft polymer of the monomers used on the polymeric emulsifying agents.

The polymer emulsions according to the invention may either be used as such for the manufacture of films and fibres, as dyeing additives for fibres, or they may be worked up to obtain the solid polymers, which may then be used in the above-mentioned areas of application in other ways. Furthermore, the polymer emulsions according to the invention may be used in the precipitation polymerization of acrylonitrile as a replacement for the dyeing comonomer.

The present invention also relates to the use of the emulsions according to the invention for the manufacture of fibres or of dyeing additives for acrylic fibres.

For the manufacture of textile fibres the emulsions first have to be converted into spinning solutions. For this purpose the polymers may be isolated by precipitation, washing and drying or by spray-drying the powder, and then dissolved in a suitable solvent. The emulsion may also be "turned round" directly into a spinnable solution, i.e. by simultaneously distilling off water and feeding in a typical solvent for acrylic polymers, e.g. dimethyl formamide or dimethyl acetamide. Spray-drying followed by re-dissolution is the preferred procedure.

As mentioned above, the polymers according to the invention may also be used as dyeing additives for fibres. These are to be understood as substances with groups with an affinity for dyes, i.e. strongly acidic groups as a rule for acrylic fibres, which are present in a concentration of 40 to 60 milli-equivalents/kg. This concentration of substances with an affinity for dyes may be introduced by means of the starter system, e.g. persulphate/$NaHSO_3$, and by means of acid comonomers, such as methallyl sulphonic acid, styrene sulphonic acid or 2-acrylamido-2-methylpropane sulphonic acid, for example. However it is desirable to exclude monomers such as these, which contain sulphonic acid groups, on economic grounds and in particular on environmental grounds. Due to their high content of sulphonate groups, which, depending on the polymeric emulsifier employed can be between 80 and 500 milli-equivalents/kg, the polymeric emulsifying agents used in the emulsion polymerisation according to the invention can be effectively used as polymeric dyeing additives in the production of acrylic fibres, i.e. the absorption of cationic dyestuff by the fibres (i.e. the absorption potential and rate of absorption) can be adjusted to the required level by adding suitable quantities of the emulsion polymers.

EXAMPLES

1. Preparation of a Polymeric Emulsifying Agent

The following materials were introduced into a 6-liter autoclave made of V4A steel whilst nitrogen was passed in:
- 2342 g deionized water
- 546 g of an alternating maleic anhydride/diisobutylene copolymer
- 1506 g of a solution of Na taurinate in water (solids content: 25.0 weight %).

After sealing the autoclave the internal temperature was raised to 100° C. and the mixture was stirred for 10 hours at this temperature and then for a further 10 hours at 140° C.

The mixture was then cooled to room temperature and the reactor contents were filtered through a filter cloth. The clear filtrate had a solids content of 19.7 weight % and contained a polymer with more than 90% of the structural units corresponding to formula (I). The remainder corresponded to units of formula (II) (determined by infrared spectroscopy).

Example 2

100 g of a 20 weight % solution of the polymeric emulsifying agent from Example 1 and 600 g deionized water were introduced into a 2-liter three-necked flask. The internal temperature was raised to 60° C. whilst passing in a gentle stream of $N_2$ and stirring at 250 rpm. Solutions I to III were then added separately over three hours:
- Solution I: 185 g acrylonitrile 15 g n-butyl acrylate
- Solution II: 1.60 g ammonium persulphate 100 g deionized water
- Solution III: 540 mg Rongalite C ($NaHSO_2 \cdot CH_2O$) 100 g deionized water.

Stirring was continued for a further four hours at 60° C.

The finely divided emulsion obtained was degassed to remove the residual monomers; for this purpose 30 ml of water was distilled of under vacuum at about 50° C. No residue remained on filtering the emulsion through a filter cloth with a mesh size of 100 $\mu$m.

Solids content: 20.3 weight %

Average particle diameter: 179 nm (the particle diameter was determined, in this Example and in the following Examples, by laser correlation spectroscopy).

Example 3

The same procedure was employed as in Example 2, except that 200 g acrylonitrile was used as Solution II.

Solids content: 20.4 weight %

Average particle diameter: 409 nm.

Example 4

Solutions I to III were added simultaneously, with stirring and with nitrogen being passed in, to a solution comprising 30 g of a 20 weight % solution of the polymeric emulsifying agent from Example 1 in 257 g deionized water, heated to a temperature of 60° C.:
- Solution I: 185 g acrylonitrile 15 g n-butyl acrylate
- Solution II: 1.60 g ammonium persulphate 100 g deionized water
- Solution III: 540 mg Rongalite C 100 g deionized water.

Stirring was continued for a further four hours at 60° C., followed by degassing under vacuum at 60° C. About 2 g polymer remained behind when the emulsion was filtered off through a filter cloth with a pore size of 100 $\mu$m.

Solids content: 32.0 weight %

Average particle diameter: 285 nm

Example 5

The following materials were introduced into a 2 liter flask, with $N_2$ being passed in and with stirring:
- 100 g of the polymeric emulsifying agent from Example 1;
- solids content: 20.0 weight % in water
- 50 g deionized water Solutions I to III were added simultaneously over three hours at a temperature of 60° C.:
- Solution I: 185 g acrylonitrile 15 g n-butyl acrylate
- Solution II: 1.60 g ammonium persulphate 100 g deionized water
- Solution III: 540 mg Rongalite C 100 g deionized water.

After the additions had been completed the reactor contents were stirred for a further four hours at 60° C.

After degassing and filtration of the emulsion obtained, about 7 g of residue remained on the filter.

Solids content: 40.7 weight %

Average particle diameter: 354 nm

Example 6

Starting material: 47 g of the polymeric emulsifying agent from Example 1: solids content: 21.3 weight % in water Solutions I to III were added simultaneously over three hours after heating the starting material to 60° C.:
- Solution I: 185 g acrylonitrile 15 g n-butyl acrylate
- Solution II: 820 mg hydrogen peroxide (35 % in water) 100 g deionized water
- Solution III: 540 mg Rongalite C 100 g deionized water.

The reaction mixture was stirred for a further six hours at 60° C. and then degassed under vacuum. The finely divided emulsion produced contained no precipitated matter.

Solids content: 19.1 weight %

Average particle diameter: 68 nm

Example 7

The following materials were introduced into a 1 liter three-necked flask with stirring and with nitrogen being passed in:
- 70.5 g of the polymeric emulsifying agent from Example 1 (21.3% solution in water)
- 59.5 g deionized water
- 7.5 ml iron ammonium sulphate solution (0.05%)

Solutions I to III were added simultaneously over three hours after heating the flask contents to 60° C.:
- Solution I: 277.5 g acrylonitrile 22.5 g n-butyl acrylate Solution II: 2.15 g hydrogen peroxide (35%) 100.00 g deionized water
Solution III: 1.22 g Rongalite C 100.00 g deionized water.

After the addition of Solutions I to III was complete, the reaction mixture was stirred for a further six hours at 60° C. and then cooled to room temperature. After degassing under vacuum a finely divided emulsion was obtained, which contained no precipitated matter.

Solids content: 50.3 weight %
Average particle diameter: 208 nm

Example 8

The following mixture was introduced into a 2-liter three-necked flask with stirring and with a gentle stream of $N_2$ being passed in:

47.0 g of the polymeric emulsifying agent from Example 1 (23% solution in water)
393.0 g deionized water
5.0 g iron ammonium sulphate (0.05% in water)

Solutions I to III were added simultaneously over three hours after heating the flask contents to a temperature of 60° C.:

Solution I: 200.00 g acrylonitrile
Solution II: 1.43 g hydrogen peroxide (35%) 100.00 g deionized water
Solution III: 0.81 g Rongalite C 100.00 g deionized water.

When the addition was complete, the reaction mixture was stirred for a further six hours at 60° C.; the emulsion produced was then degassed under vacuum.

Solids content: 23.4 weight %
Average particle diameter: 366 nm.

Examples of use

The following examples of use illustrate the use of the emulsion polymers according to the invention for the manufacture of acrylic fibres (Example 9) and as dyeing additives (Example 10), respectively.

Example 9

The polymer from a 30 weight % aqueous emulsion of a copolymer formed from 92.5 weight % acrylonitrile and 7.5 weight % n-butyl acrylate was isolated by evaporative concentration, and was dried to constant weight at 70° C. in a vacuum drying cabinet. The K value of the copolymer, which was measured in dimethyl formamide with electrolyte additions (3 g NaNO$_3$/l), was 100.8. The K value was determined according to the method described by H. Fikentscher, Cellulosechemic 15 (1932), page 58.

A spinning solution with a solids content of 23 weight % and a solution viscosity of 120 Pa.s, measured at 30° C., was prepared by dissolving the copolymer in dimethyl formamide.

This solution was spun under the usual dry-spinning conditions in an experimental spinning shaft, using a 16-orifice nozzle, the diameter of each orifice being 0.2 mm. During this operation, the temperature in the spinning shaft was 200° C. and the air temperature was 250° C. The spun fibres were drawn off at a rate of 130 m/minute. The fibres were subsequently processed in two stages: first stage: hot water stretching at 94° C. at a stretching ratio of 5:0; second stage: hot air fixation at 160° C. with a relaxation of 14%. This resulted in a total stretching ratio of 1:4.1.

Fibres were also spun from a commercially available acrylic polymer under the same spinning conditions for comparison purposes.

This acrylic polymer had the following composition:

| acrylonitrile | 93.5 weight % |
| acrylic acid methyl ester | 5.8 weight % |
| Na methallyl sulphonate | 0.5 weight % | and had a K value of 84.2. The concentration of strongly acidic groups was 59 milli-equivalents/kg.

Table 1 below compares the properties of the fibres obtained from Example 9 with those of the fibres spun from the commercially available polymer:

TABLE 1

| | Example 9 | Comparison |
|---|---|---|
| Titre (individual fibres) | 4.30 | 6.70 |
| Strength [cN/dtex] | 3.46 | 2.72 |
| Elongation (max.) [%] | 20.3 | 45.3 |
| Scalding shrinkage | 6.0 | 1.0 |
| Strongly acidic groups active in dyeing [milli-equivalents/kg] | 92.0 | 59.0 |

Example 9 clearly shows that fibres with a high content of groups with an affinity for dyeing can be obtained by using the emulsion polymers according to the invention. Values such as this can only be obtained otherwise by the polymerization of sulphonate dyeing comonomers into acrylic polymers.

Example 10

Dyeing additive replacement:
A 20.5 weight % spinning solution in DMF was prepared from:

35.5 weight % of a copolymer obtained as in Example 7 from 92.5 % acrylonitrile and 7.5 % n-butyl acrylate
64.5 weight % of a commercially available acrylonitrile monopolymer.
Composition: 100% acrylonitrile
K value: 92.5
Concentration of strongly acidic groups 23.4 milli-equivalents/kg The viscosity of the spinning solution was 63 Pa.s at 30° C. (shear gradient: 22 sec$^{-1}$).

This solution was spun as described in Example 9.

The spinning and subsequent processing conditions and the mechanical properties of the fibres obtained compared with a commercially available acrylic polymer and with an ACN monopolymer are summarized in Table 2.

TABLE 2

| | Example 10 | Acrylic polymer from Example 9 | Commercially available ACN monopolymer |
|---|---|---|---|
| Spinning conditions: | | | |
| Solution concentration [%] | 20.5 | 26.0 | 24.5 |
| Viscosity at 30° C. [Pa · s] | 63 | 96 | 134 |
| Shaft temperature [°C.] | 200 | 200 | 200 |
| Air temperature [°C.] | 250 | 250 | 250 |
| Nozzle [orifices/diameter in mm] | 16/0.2 | 16/0.2 | 16/0.2 |
| Pull-off rate [m/minute] | 130 | 130 | 130 |
| Subsequent processing | | | |

TABLE 2-continued

|  | Example 10 | Acrylic polymer from Example 9 | Commercially available ACN monopolymer |
|---|---|---|---|
| conditions: | | | |
| Stage 1: (pre-stretching) | | | |
| Stretching temperature | 96 | 95 | 94 |
| Stretching ratio | 6.0 | 4.0 | 6.0 |
| Stage 2: | | | |
| (relaxation + fixation) | | | |
| Stretching temperature [°C.] | 161 | 160 | 160 |
| Total stretching ratio | 5.2 | 3.4 | 5.1 |
| Relaxation [%] | 14 | 15 | 15 |
| Fibre data | | | |
| (individual fibres): | | | |
| Titre [dtex] | 3.39 | 6.70 | 4.12 |
| Strength (max.) [cN/dtex] | 3.90 | 2.72 | 4.49 |
| Elongation (max.) [%] | 19.8 | 45.3 | 26.1 |
| Scalding shrinkage [%] | — | 1.0 | 2.0 |
| Content of groups effective in dyeing [milli-equivalents/kg] | 60.1 | 59.0 | 23.4 |

We claim:

1. A method of preparing aqueous emulsions of acrylonitrile (co)polymers with acrylonitrile contents from 80 to 100 weight % in the (co)polymer, characterized in that monomer mixtures containing at least 80 weight % of acrylonitrile are polymerized in aqueous emulsion in the presence of radical initiators and in the presence of a polymeric emulsifying agent comprising a polymer containing structural units corresponding to formulae (I) and/or (II)

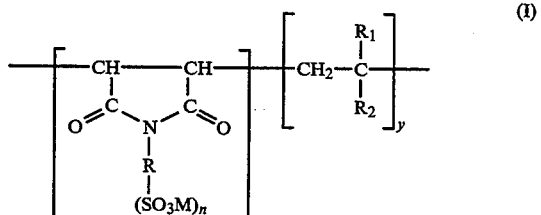

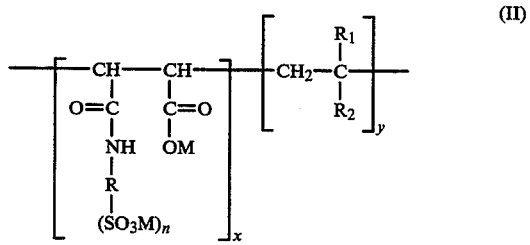

where
M represents a cation-forming radical,
n is 1 or 2,
R represents a hydrocarbon chain with 1 to 10 C atoms or an aromatic radical with 6 to 10 C atoms, or $-(CH_2)_2NH(CH_2)_2-$,
$R_1$ represents H or $-CH_3$,
$R_2$ represents H, a $C_1-C_{16}$ alkyl radical, or phenyl
x and y are selected so that the weight average molecular weight $M_W$ of the polymer is 2000 to 500,000 and the x:y ratio is 1:4 to 1:1.

2. A method according to claim 1, wherein the polymer contains >80% of structural units (I).

3. A method according to claim 1, wherein the monomer mixtures comprise acrylonitrile and one or more of styrene, alphamethyl styrene, vinyl acetate, ethyl acrylate, methyl methacrylate, n-butyl acrylate, i-butyl acrylate, methyl acrylate, 2-ethylhexyl acrylate, vinyl chloride, vinylidene chloride, or vinyl bromide.

4. A method according to claim 1, wherein the initiator is a redox initiator.

5. An aqueous emulsion prepared by the process of claim 1.

6. An aqueous emulsion as claimed in claim 5 having a solids content of 10 to 55 weight percent.

7. An aqueous emulsion as claimed in claim 5, wherein the polymer has a K value from 60 to 150.

8. An aqueous emulsion as claimed in claim 5, wherein the polymer in the emulsion has an average particle diameter of 60 to 500 nm.

* * * * *